US012067451B2

(12) United States Patent
Dutt et al.

(10) Patent No.: US 12,067,451 B2
(45) Date of Patent: *Aug. 20, 2024

(54) ERGONOMIC RING SCANNER ORIENTED IN A NEUTRAL GRIP POSITION, AND APPLICATIONS THEREOF

(71) Applicant: Infinite Peripherals, Inc., Irvine, CA (US)

(72) Inventors: Patrick Dutt, Eastvale, CA (US); Sam Pyo, Fullerton, CA (US)

(73) Assignee: Infinite Peripherals, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,626

(22) Filed: May 2, 2022

(65) Prior Publication Data

US 2022/0383014 A1    Dec. 1, 2022

Related U.S. Application Data

(63) Continuation of application No. 17/330,090, filed on May 25, 2021, now Pat. No. 11,397,866.

(51) Int. Cl.
*G06K 7/10*    (2006.01)

(52) U.S. Cl.
CPC .......... *G06K 7/10891* (2013.01); *G06K 2007/10534* (2013.01)

(58) Field of Classification Search
CPC .......... G06K 7/10891; G06K 2007/10534
USPC .......... 235/462.43, 462.44, 472.01
See application file for complete search history.

(56) References Cited

U.S. PATENT DOCUMENTS

| 4,575,833 A | * | 3/1986 | Bakhtiari | ........... G04B 37/0058 |
| | | | | 968/301 |
| 10,789,436 B1 | | 9/2020 | Lim et al. | |
| 11,288,474 B1 | * | 3/2022 | Broderick | .......... G06K 7/10891 |
| 11,397,866 B1 | | 7/2022 | Dutt et al. | |
| 2002/0017567 A1 | * | 2/2002 | Connolly | ............... G04B 47/00 |
| | | | | 235/472.02 |

(Continued)

FOREIGN PATENT DOCUMENTS

| CN | 206498226 U | * | 9/2017 | |
| KR | 2020122615 A | * | 10/2020 | ......... G06K 7/10891 |

OTHER PUBLICATIONS

Machine equivalent translation of KR 2020-0122615, Korean Patent Office, retrieved Dec. 2021 (Year: 2021).*

(Continued)

*Primary Examiner* — Suezu Ellis
(74) *Attorney, Agent, or Firm* — Sterne, Kessler, Goldstein & Fox P.L.L.C.

(57) ABSTRACT

Embodiments position a barcode reader, or other optical detector, to scan upright barcodes when the user's hand is in the neutral position. To do this, embodiments rest the body of the ring scanner device on top of the index finger, with the palm facing inward toward the user's body. Embodiments have integrated interactivity, including a touchscreen display and separate buttons that can be used to operate the optical detector and input data into an integrated computing device. The integrated computing device can run software applications on board the ring scanner device. Finally, the integrated computing device can be remotely managed.

17 Claims, 11 Drawing Sheets

(56) References Cited

U.S. PATENT DOCUMENTS

| | | | |
|---|---|---|---|
| 2007/0171090 A1* | 7/2007 | Newman | G06K 7/10891 340/815.45 |
| 2008/0054039 A1 | 3/2008 | Wulff et al. | |
| 2008/0078837 A1* | 4/2008 | Morris | G06K 7/10891 235/462.44 |
| 2015/0277559 A1* | 10/2015 | Vescovi | G06F 3/017 345/173 |
| 2016/0180132 A1* | 6/2016 | Lim | G06K 7/10544 235/435 |
| 2016/0267310 A1* | 9/2016 | AlNasser | G06F 1/1698 |
| 2017/0346320 A1* | 11/2017 | Jeong | H02J 7/0044 |
| 2018/0167549 A1* | 6/2018 | Lim | G06K 7/10722 |
| 2019/0348848 A1 | 11/2019 | Segnit | |
| 2020/0343775 A1* | 10/2020 | Yahagi | H02J 50/12 |
| 2023/0267290 A1* | 8/2023 | Vargas | G06K 7/10881 235/472.01 |

OTHER PUBLICATIONS

Machine equivalent translation of CN-206498226, retrieved 2021 (Year: 2021).*

RS6000 1D/2D Bluetooth Ring Scanner Product Spec Sheet, https://Avwww.zebra.com/content/dam/zebra_new_ia/en-us/solutions-verticals/product/Mobile_Computers/Wearable%20Computers/rs6000-bluetooth-ring-scanner/spec-sheet/rs6000-specification-sheet-en-us.pdf, 2 p. 2016, retrieved 2021 (Year: 2021).*

Machine translation of KR 20200122615 from European Patent Office, retrieved Dec. 2, 2023 (Year: 2023).*

International Search Report and Written Opinion of the International Searching Authority directed to International Patent Application No. PCT/US2022/030944, mailed Oct. 24, 2022; 17 pages.

International Preliminary Report on Patentability directed to International Patent Application No. PCT/US2022/030944, issued Nov. 21, 2023; 13 pages.

* cited by examiner

ERGONOMIC RING SCANNER ORIENTED IN A NEUTRAL GRIP POSITION, AND APPLICATIONS THEREOF

BACKGROUND

Field

This field is generally related to scanning devices.

Related Art

Optical labels, such as barcodes, represent data in a visual, machine-readable format. One type of barcode, known as linear or one-dimensional (1D) barcodes, can represent data by varying the widths and spacing of parallel lines. Another type of barcode, known as matrix codes or two-dimensional (2D) barcodes, uses rectangles, dots, hexagons and other patterns to represent data.

Barcodes have many applications. In stores, universal product code (UPC) barcodes are pre-printed on most items and are used for inventory and to check out. Barcodes are used in healthcare and hospital settings, for things like patient identification (to access patient data, including medical history, drug allergies, etc.). They can also be used to keep track of objects and people; they are used to keep track of rental cars, airline luggage, nuclear waste, registered mail, express mail and parcels. Barcoded tickets allow the holder to enter sports arenas, cinemas, theatres, fairgrounds, and transportation, and are used to record the arrival and departure of vehicles from rental facilities etc.

A barcode reader (or barcode scanner) is an optical scanner that can read printed barcodes, decode the data contained in the barcode and send the data to a computer. One type of handheld scanner is gripped in a user's palm. With these handheld barcode scanners, the user encloses the handle with all five fingers and uses the trigger button to activate the scanner, like the operation of a handgun. One downside of the handheld barcode scanner is that the user of the scanner has to put down the scanner to use his hand. If the user is transporting packages or taking inventory having to repeatedly put down and pick up the scanner can result in lost productivity.

To reduce this inefficiency, ring scanners operate by looping around at least one finger, enabling an operator to continue using both hands while carrying the scanner. In this way, workers can continue to use both hands when climbing ladders or stairs, handling large items, or operating machinery. One such ring scanner is illustrated in FIG. 1.

FIG. 1 shows a diagram 100 that illustrates a ring scanner 104 being held by hand 102. Ring scanner 104 includes a barcode scanner 106 and a button 114. Button 114 is positioned to be selected by a thumb 112 of hand 102. Ring scanner 104 has a loop (not shown) through which an index finger and middle finger of hand 102 pass through. With the index finger and middle finger of hand 102 through the loop of ring scanner 104, barcode scanner 106 rests on top of the index and middle fingers of hand 102.

As illustrated in diagram 100, ring scanner 104 is oriented to capture a barcode 106. When thumb 112 selects button 114, barcode scanner 106 projects light 108 to read barcode 106. In this example, barcode 106 is a one-dimensional barcode. To capture the barcode 106, hand 102 is pronated, that is, a palms-down position with thumb 112 pointed inward toward the body. To orient hand 102 in pronation, the user must twist its forearm 118. Repeated or excessive pronation can lead to fatigue, discomfort, pain and eventually injury.

In addition, prior art ring scanner 104 lacks capabilities beyond the ability to scan data. To add additional capabilities such as to output and input data, a secondary device 110 is strapped to the user's forearm 118 and is connected to the ring scanner 104 using a cable 120. However, having a secondary device 110 attached to a user's forearm adds bulk and discomfort.

In some cases, ring scanners are not even connected to such secondary devices. If output is needed for the operator, it may be presented in a separate screen that the operator might not even be viewing. In one example operation, a postage worker may be scanning packages and some subset of those packages may be flagged for the postage worker to take aside for further inspection. In the postage worker example, there may be a separate monitor that displays data when the worker scans a package that needs special treatment.

Finally, many ring scanners lack the ability to update their operation remotely. In general, most ring scanners have static operation that is preprogrammed and hardcoded. To alter operation of the device, an administrator often has to be in physical contact with the device.

To address these issues, improved rings scanners are needed.

BRIEF SUMMARY

A first embodiment provides an ergonomic ring scanner device. The ring scanner device includes an optical detector, a loop, and a body piece. The optical detector is positioned on the scanner device read an optical label. The loop is configured to be gripped by at least one finger of a hand of a user. The body piece includes an upper body portion affixed to the optical detector and the loop such that, when at least one finger grips the loop and the hand is in a neutral position, the body piece is positioned to rest on a portion of an index finger of the hand, the portion facing a thumb of the hand.

A second embodiment provides a charging cradle assembly. The charging cradle assembly includes a vertical back panel and a cradle protruding from the vertical back panel. The cradle is configured to electrically couple with a ring scanner device.

System, device, and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements. The drawings are illustrative and may not be to scale.

DETAILED DESCRIPTION

As described above, prior art ring scanners typically situate the main body of the device, including the optical scanner, to rest on the middle and index finger, opposite of the user's palm. Moreover, these ring scanners normally have the barcode reader oriented to scan upright barcodes when the user's hand is pronated. Embodiments disclosed herein overcome these issues by instead positioning the barcode reader, or other optical detector, to scan upright barcodes when the user hand is in the neutral position. To do this, embodiments rest the body of the ring scanner device on top of the index finger, with the palm facing inward toward the users body.

Also, as described above, prior art ring scanners are limited in their interactivity. The most part, the ring scanners lack output display devices or input devices, and instead rely on external devices, perhaps strapped to the user's forearm. Embodiments have integrated interactivity, including a touchscreen display and separate buttons that can be used to operate the optical detector and input data into an integrated computing device. The integrated computing device can run software applications on board the ring scanner device.

The integrated computing device can be remotely managed. A mobile device management console allows an administrator to control, secure, and enforce policies, and install and uninstall applications on the ring scanner devices. In this way, embodiments provide remote management of a whole group of ring scanner devices. Aspects of each of these embodiments and advantages, along with other features and advantages, are described below with respect to the accompanying drawings.

Figure 1:
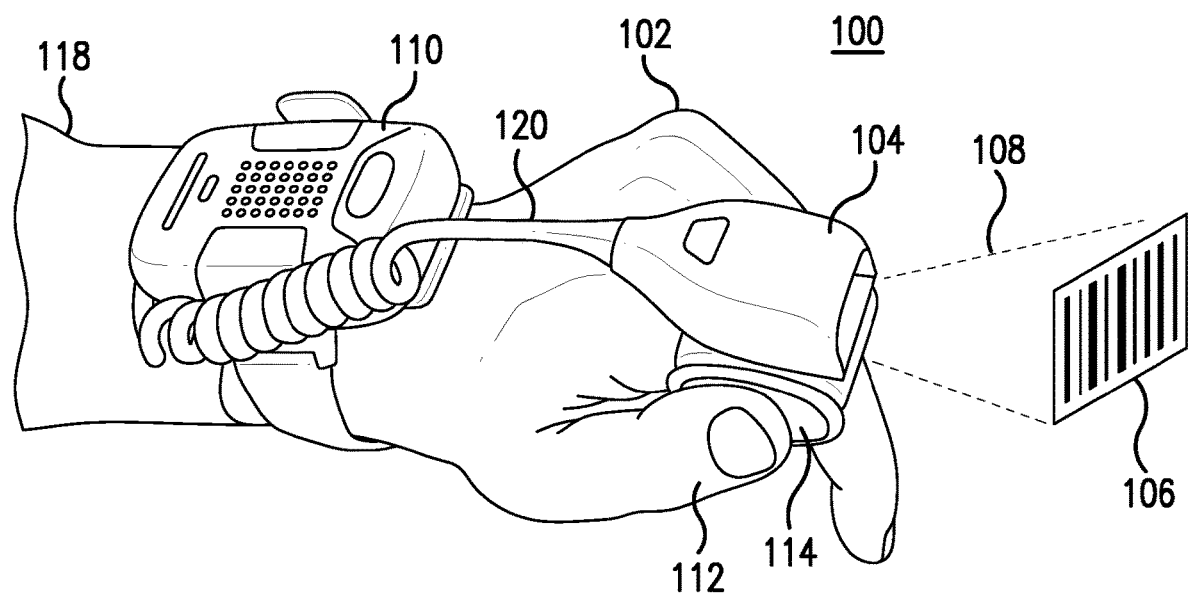
FIG. 1 is a diagram illustrating a prior art ring scanner in operation.
Figure 2A:
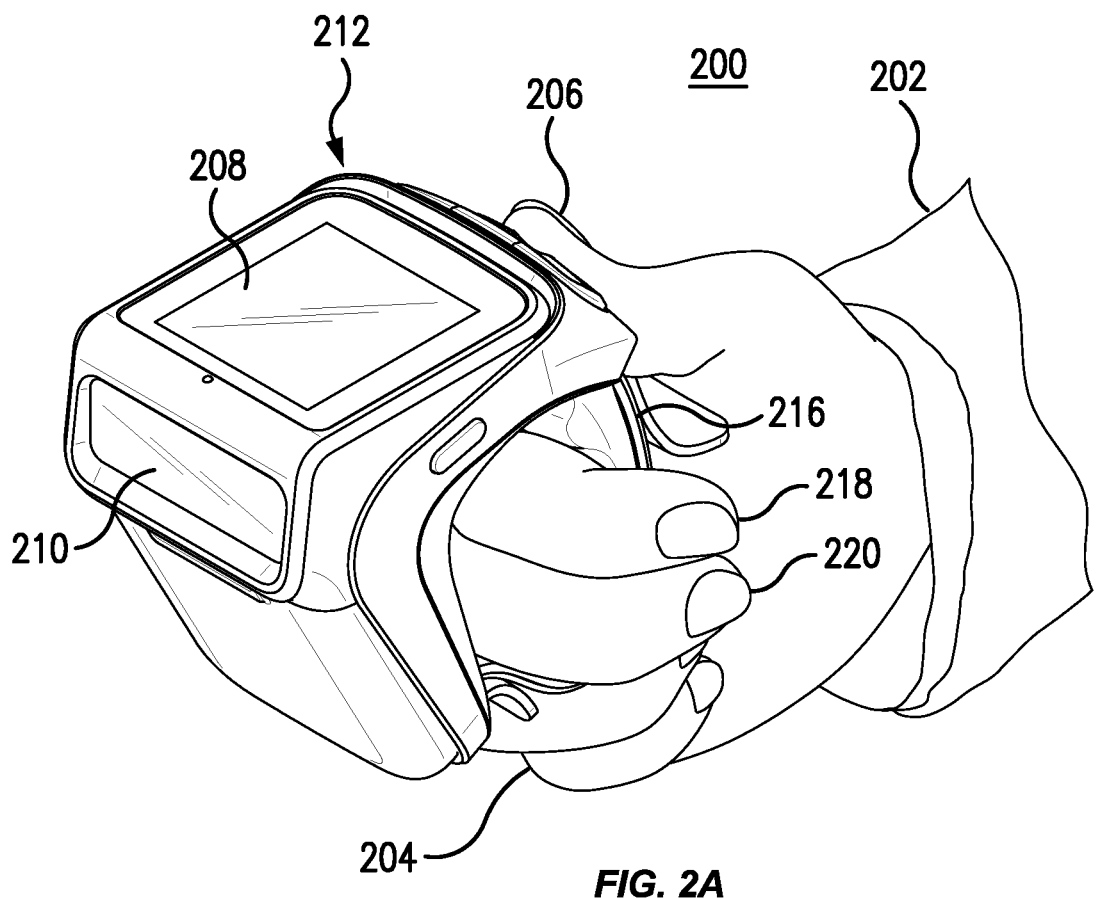
FIGS. 2A and 2B are diagrams illustrating a ring scanner in operation, according to an embodiment.
Figure 2B:
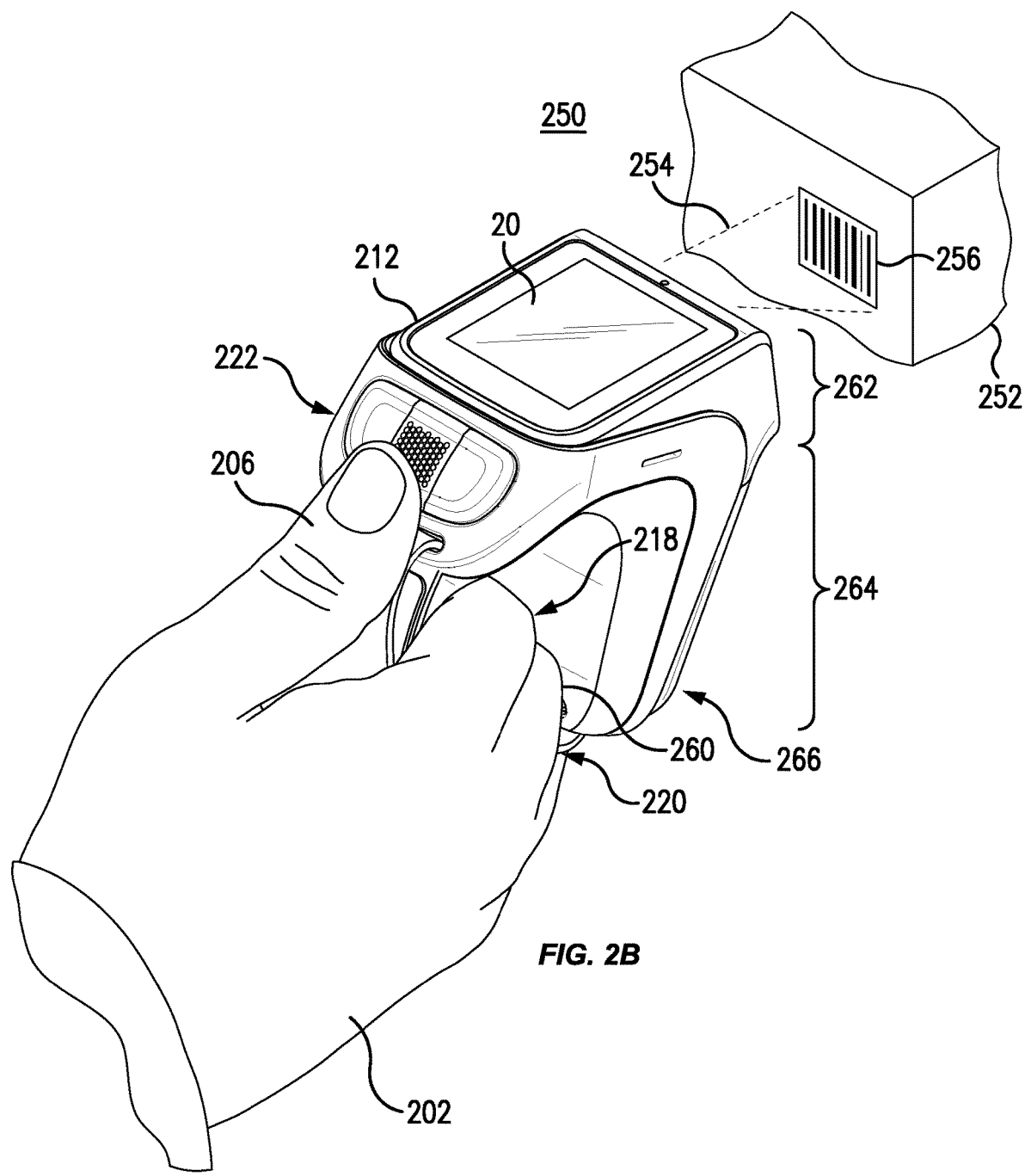

FIGS. 2A and 2B are diagrams illustrating a ring scanner in operation, according to an embodiment. FIG. 2A shows a diagram 200 with a user/operator having a hand 204 and forearm 202. Hand 204 is gripping a ring scanner device 212. Ring scanner device 212 has a display 208 and an optical detector 210.

As can be seen in diagram 200, ring scanner device 212 has a loop 216 through which an index finger 218 and a middle finger 220 pass through to grip and hold ring scanner device 212. Loop 216 is configured to be gripped by index finger 218 and middle finger 220. It presses against the palmar side of index finger 218 and middle finger 220. Because loop 216 enables an operator to grip ring scanner device 212 with just a loop around the operator's fingers, the operator maintains use of her hands. For example, the operator can continue to use her hands to operate equipment, carry packages, and climb ladders.

According to an embodiment, loop 216 is configured to be gripped by index finger 218 and middle finger 220 such that the palm is in a neutral position when the optical detector is oriented in an upright direction. In this way, a user need not pronate the hand when transitioning from using the hand to grip a package from the package's side to scanning the optical label. The user's forearm 202 need not twist when scanning. Avoiding twisting in this way, embodiments can avoid fatigue, discomfort, pain and even possible injury.

Display 208 is an output device for presentation of information in visual form. It outputs information that is supplied to it from a computing device (not shown) in ring scanner device 212, converting electrical signals into light. In different examples, display 208 can be an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, quantum dot (QLED) display, or electronic paper, such as E INK paper available from E Ink Corporation of Cambridge, Massachusetts.

Optical detector 210 is an optical scanner that can read printed optical labels such as barcodes, decode the data contained in the optical label, and send the data to a computer. It may include a light source, a lens, and a light sensor translating for optical impulses into electrical signals. In different embodiments, optical detector 210 can be a pen-type reader, a laser scanner, a charge-coupled device (CCD) reader, a light emitting diode (LED) scanner, a camera-based reader, a video camera reader, a large field-of-view reader, or an omnidirectional barcode scanner.

FIG. 2B shows a diagram 250 illustrating ring scanner device 212 from a different perspective. As shown in diagram 200, ring scanner device 212 is in this position to project light 254 to capture a barcode 256 on package 252.

As shown in diagram 250, barcode 256 is oriented in a horizontal direction, read left to right or right to left. Barcode 256 is a linear dimensional (1D), one dimensional barcode with its lines running vertical to ground. In other embodiments, barcode 256 may be two-dimensional and use rectangles, dots, hexagons and other patterns.

As shown in diagram 250, when positioned to capture barcode 256 in an upright direction the user's palm of hand 202 hand is oriented substantially vertically. The palm of hand 202 is orthogonal to the ground.

As shown in diagram 250, ring scanner device 212 includes a body piece 266, which includes an upper body portion 262 and a lower body 264. Upper body portion 262 rests on a portion of index finger 218 facing a thumb 206 of hand 202. Lower body 264 covers a dorsal side of index finger 218 and middle finger 220 of hand 202. Upper body portion 262 and lower body 264 are affixed to one another and angled to cover at least a portion of the thumb-facing side of index finger 218 and the dorsal side of middle finger 220. Together with loop 216, upper body portion 262 and lower body portion 264 encircle index finger 218 and middle finger 220. More specifically, together with loop 216 (labeled in FIG. 2A), upper body portion lower body portion may encircle a middle phalanx portion index finger 218 and middle finger 220.

Upper body portion 262 includes a plurality of buttons 222 that, when selected, causes ring scanner device 212 to perform certain actions. Each of the plurality of buttons 222 may be a switch mechanism with a surface that can be depressed, or pushed, by a finger. When the surface is depressed an electrical signal is sent to input information and possibly trigger an action. Each of the plurality of buttons 222 may have a spring to return to their un-pushed state. Other types of buttons may be used as well, such as virtual buttons presented on a touchscreen display.

As will be described below, plurality of buttons 222 may cause optical detector 210 to activate and scan barcode 256 or may input data into a computing device controlling aspects of ring scanner device 212. Plurality of buttons 222 are positioned on ring scanner device 212 to be selected by thumb 206.

In particular, plurality of buttons 222 are positioned to be selected by thumb 206 when hand 202 is gripping a ring scanner device 212, and index finger 218 and middle finger 220 are bent. According to an embodiment, plurality of buttons 222 are positioned to be selected when index finger 218 and middle finger 220 are bent at a proximal interphalangeal joint 260. Proximal interphalangeal joint 260 sits between a middle phalanx and proximal phalanx of index finger 218 and middle finger 220. Bending at proximal interphalangeal joint 260 may be more ergonomical than bending other joints, such as the metacarpophalangeal joint of index finger 218 and middle finger 220.

Display 208 may be a touchscreen display. A touchscreen display is an assembly of both an input (touch panel) and output (display) device. The touch panel may be layered on the top of the output electronic visual display. A user can give input or control a computing device (not shown) in ring scanner device 212 through simple or multi-touch gestures by touching the screen with a special stylus or one or more fingers. In different examples, a touch panel may be a resistive touchscreen panel, a surface acoustic wave (SAW) touch panel, a capacitive touchscreen panel, or an infrared touchscreen panel.

When display 208 is a touchscreen display, display 208 will also be positioned such that at least a portion of display 208 can be selected by thumb 206 when hand 202 is gripping a ring scanner device 212, and index finger 218 and middle finger 220 are bent at the proximal interphalangeal joint 260. Display 208 is configured to output visually from the computing device.

Figure 3A:
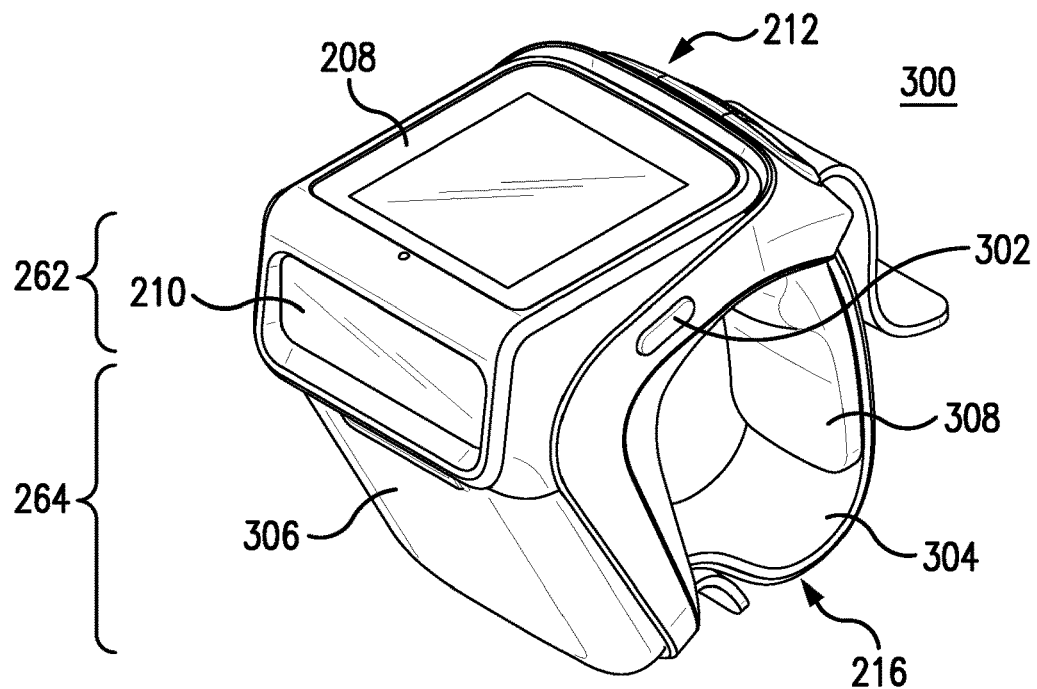
FIGS. 3A-C are schematic diagrams illustrating the ring scanner in greater detail, according to an embodiment.
Figure 3B:
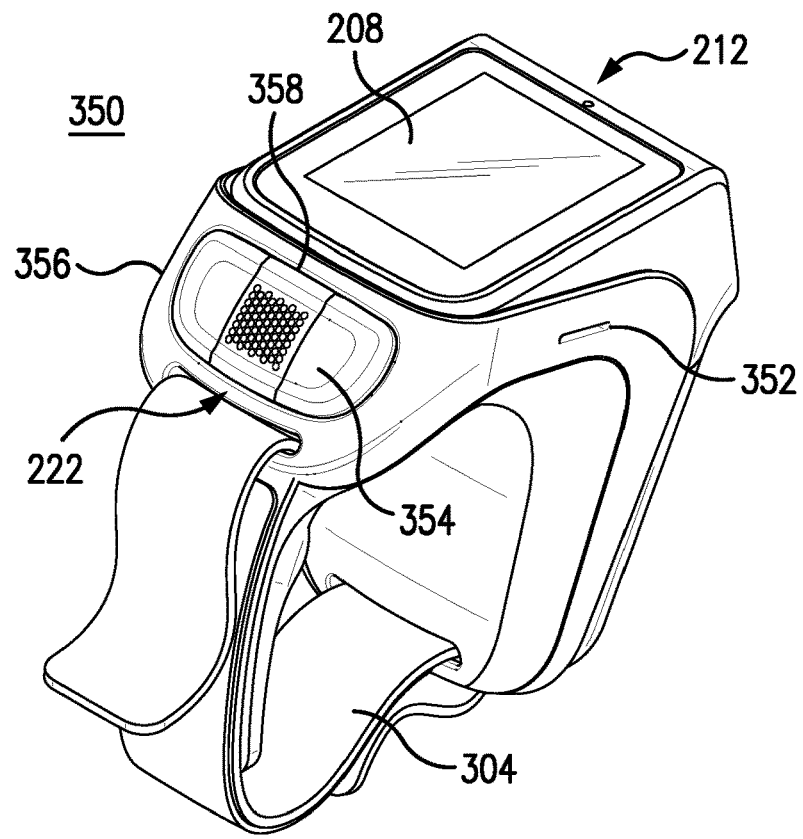
Figure 3C:
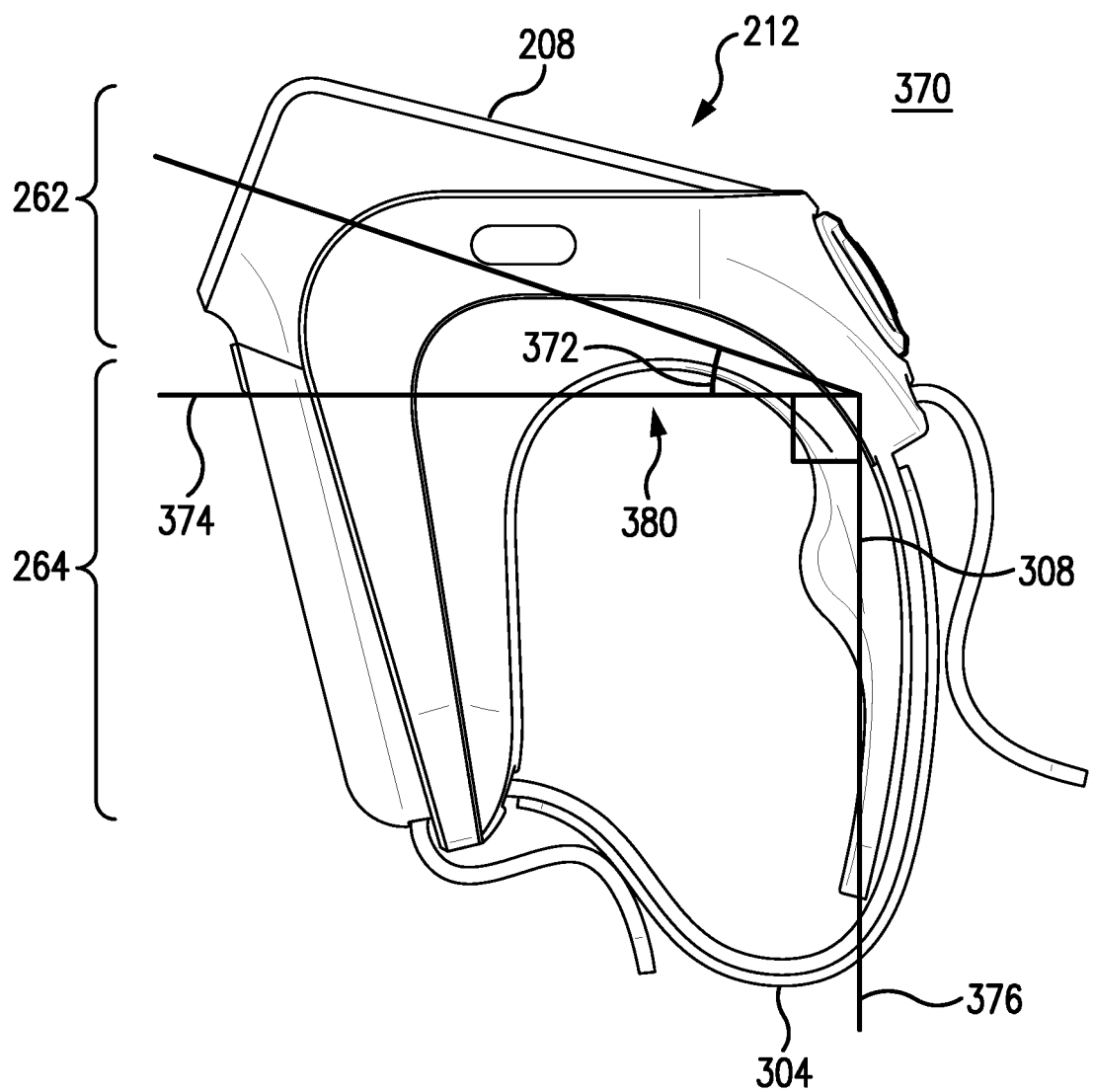

FIGS. 3A-C are schematic diagrams illustrating the ring scanner in greater detail, according to an embodiment. FIG. 3A illustrates a front three-quarter view 300 of ring scanner device 212. As shown from this perspective, ring scanner device 212 includes a battery 306, power button 302, strap 304, and semi-rigid portion 308.

Battery 306 is a device including one or more electrochemical cells to provide power for ring scanner device 212. In an example, battery 306 may be a lithium-ion battery. According to an embodiment, battery 306 may be removable so that it can be swapped out with fully charged batteries when battery 306 is depleted. Additionally or alternatively, battery 306 could be internal to ring scanner device 212 and not removable. Battery 306 can be rechargeable, as will be discussed below with respect to FIGS. 5 and 6.

Power button 302 is a button that, when selected, causes ring scanner device 212 to power on or off. When ring scanner device 212 powers on, electricity is delivered from battery 306 to components of ring scanner device 212, such as optical scanner 210, display device 208, and other hardware components as will be discussed in greater detail with respect to FIG. 7.

Strap 304 is a ribbon used to fasten ring scanner device 212 to the operator's fingers. As described above, strap 304, in conjunction with other components of ring scanner device 212 may encircle an operator's fingers. Strap 304 may be made of nylon webbing, leather or other flexible materials. It also may be adjustable strap positioned to encircle the at least one finger.

Semi-rigid portion 308 protrudes from upper portion 262 and is situated behind strap 304, in particular between strap 304 and the operator's fingers (not shown). Semi-rigid portion 308 may be flexible such that, as strap 304 is tightened, the tightened strap may pull semi-rigid portion 308 to tighten on the operator's fingers. Semi-rigid portion 308 may serve to allow strap 304 to be tightened, enabling the operator to maintain a tight grip on ring scanner device 212 without irritating the operator's fingers. In an embodiment, semi-rigid portion 308 may be made of rubber or a rubber-like material. In illustrative examples, semi-rigid portion 308 may be made of Thermoplastic Polyurethane (TPU), Thermoplastic Elastomer (TPE), butyl (IIR), nitrile (NBR), Neoprene® (CR), Ethylene Propylene Diene Monomer (EPDM), Silicone (Q), or Viton®.

FIG. 3B illustrates a rear three-quarter view 350 of ring scanner device 212. As can be seen from this perspective, ring scanner device 212 includes a speaker 352 and plurality of buttons 222.

Speaker 352 is a device which converts an electrical audio signal into a corresponding audible sound. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, Heil air motion transducers, transparent ionic conduction speakers, plasma arc speakers, thermoacoustic speakers, rotary woofers, moving-coil, electrostatic, electret, planar magnetic, and balanced armature.

As illustrated in FIG. 3B, plurality of buttons 222 includes three buttons: left button 356, right button 354, and center button 358. Left and right buttons 356 may input selections into a computing device (not shown) in ring scanner device 212. This may cause an action to be specified by an application running on the computing device. In one example, the application may display a menu on display 208 and selecting buttons 354-356 may enable a user to navigate up and down through the menu. In this way, embodiments enable interactive applications to be executed by ring scanner device 212.

Center button 358 is configured to, when selected, activate optical detector 210 to read a barcode. It also may send input data to the computing device.

FIG. 3C illustrates a side view 370 of ring scanner device 212. As can be seen from side view 370, ring scanner device 212 includes upper body portion 262 and lower body portion 264. As mentioned above, ring scanner device 212 may rest on a portion of an operator's index finger facing the operator's thumb at position 380.

Vertical line 376 may represent substantially the orientation of semi-rigid portion 308. Vertical line 376 may represent substantially the orientation of the user's hand in neutral position. Horizontal line 374 runs perpendicular to vertical line 376.

As illustrated in diagram 370, display 208 is angled away from horizontal 374 at angle 372. Angle 372 may be such that a user can select at least a portion (or the entirety of) display 208 with angle 374 away from a horizontal 374. Horizontal 374 runs vertical 376.

Figure 4:
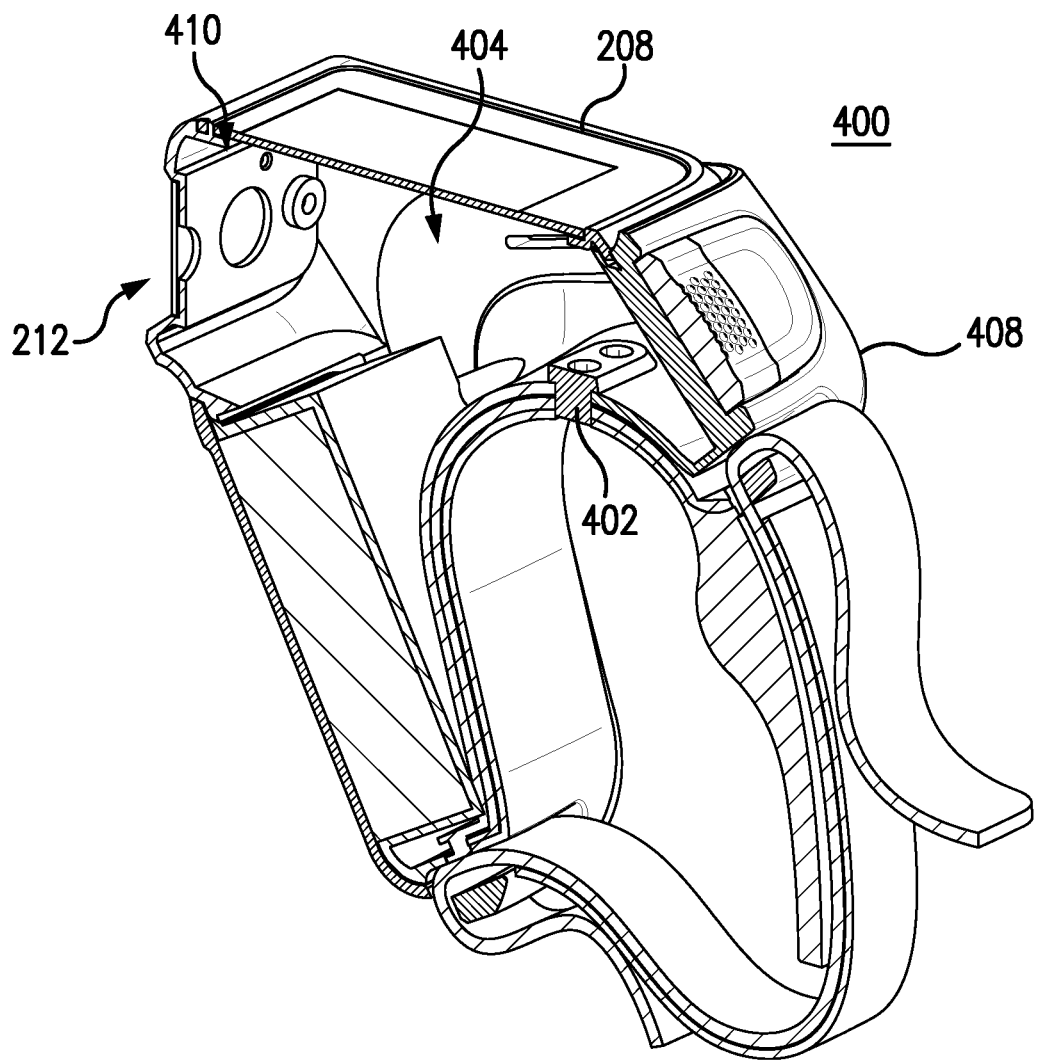
FIG. 4 is a cross section of the ring scanner, according to an embodiment.

FIG. 4 is a cross section 400 of ring scanner device 212, according to an embodiment. As shown in cross section 400, ring scanner device 212 includes a housing 408.

Housing 408 is a protective exterior (e.g. shell) or an enclosing structural element (e.g. chassis or exoskeleton)

designed to enable easier handling, provide attachment points for internal mechanisms (e.g. mounting brackets for electrical components, cables and pipings), maintain cleanliness of the contents by shielding dirt/dust, fouling and other contaminations, or protect interior mechanisms (e.g. delicate integrated electrical fittings) from structural stress and/or potential physical damage.

Figure 7:
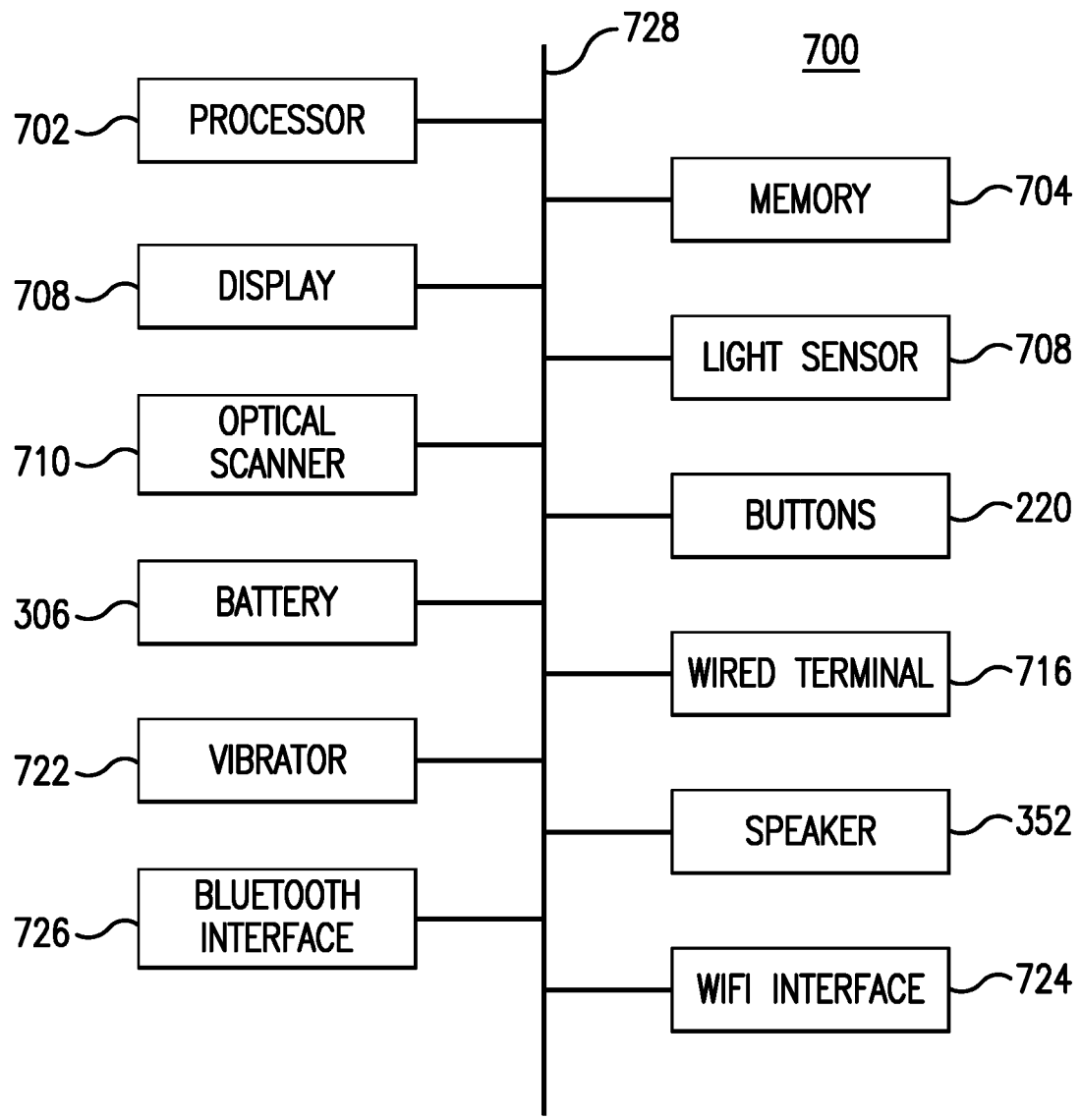
FIG. 7 is an architecture diagram illustrating hardware components of the ring scanner, according to an embodiment.

The interior of housing 408 include a cavity 404 that contains various electronic components, as illustrated in FIG. 7. Housing 408 includes an opening 410 for touch screen 208 and other openings, such as an opening for a charging port 402.

Charging port 402 is configured to electrically couple ring scanner device 212 to a cradle and positioned directed toward the loop. Charging port 402 may be a USB port as discussed with respect to FIG. 7 below. Ring scanner device 212 may include at least one magnet (not shown) positioned to align the charging port to the cradle to enable electrical coupling.

Alternatively or additionally, ring scanner device 212 may be capable of wireless charging. For example, ring scanner device 212 may have a silicon chip that receives a beacon signal to charge the device. For example, the chip may enable a power transmitter to locate a device and transmit power directly to the about device, along the path used to detect the chip. This path based functionality may allow the wireless power transmitter to continuously and safely sent power when needed. In examples, ring scanner device 212 may use the COTA power transmitter/receiver available from Ossia Inc. of Bellevue, WA or the WattUp power transmitter/receiver available from Energous Corporation.

Figure 5:
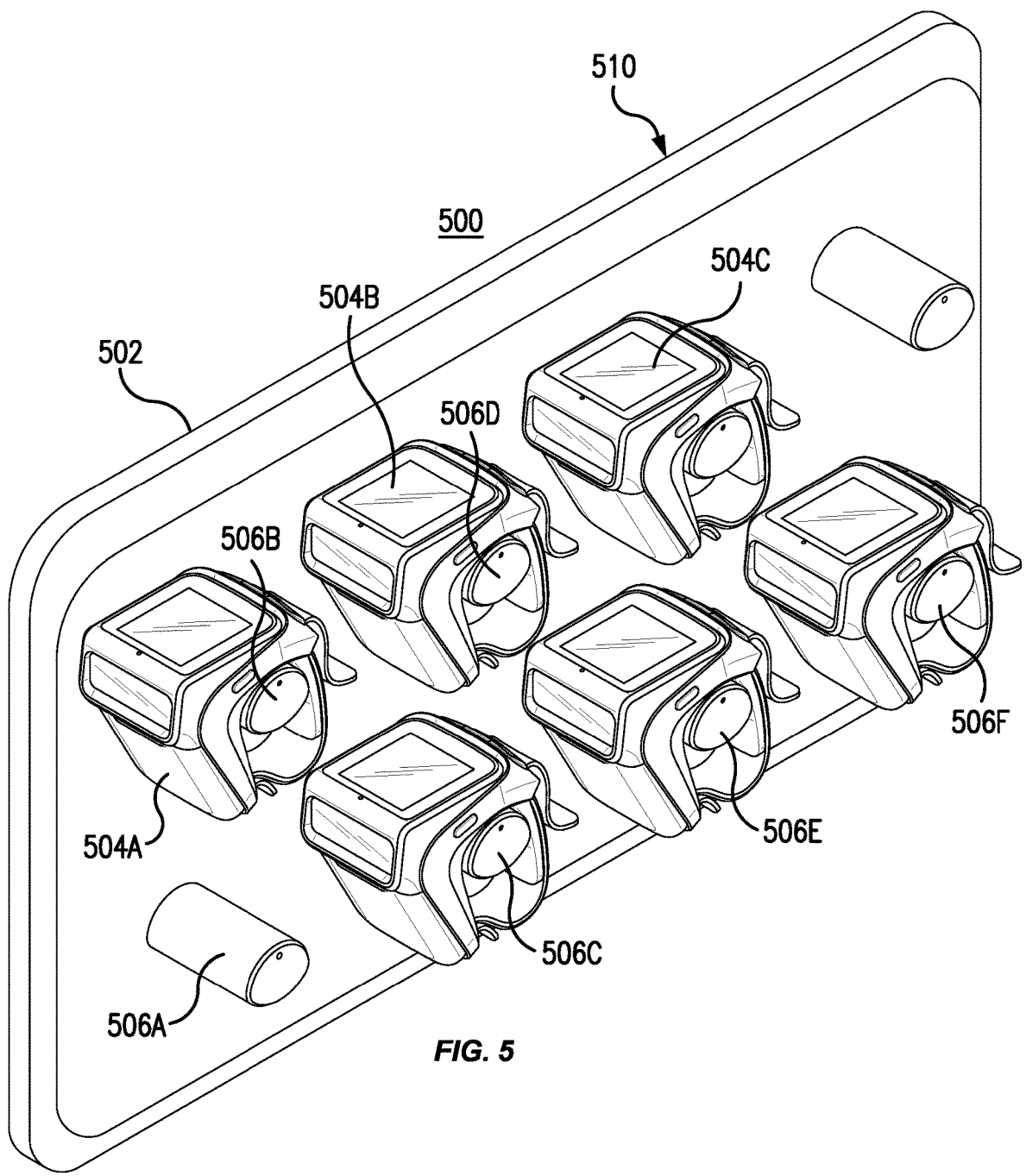
FIGS. 5 and 6 are diagrams illustrating charging cradles for the ring scanner, according to an embodiment.

FIG. 5 is a diagram 500 illustrating a charging cradle apparatus 510 for a ring scanner device, according to an embodiment. Charging cradle apparatus 510 includes a back panel 502 and a plurality of charging cradles 506A-F.

Back panel 502 may be a substantially planar piece configured to be mounted vertically, such as against a wall. Each of the plurality of charging cradles 506A-F protrude from back panel 502. Back panel 502 may include electrical circuitry to communicatively and electrically connect the plurality of charging cradles 506A-F. In one example, back panel 502 may include a USB hub.

Each of the plurality of charging cradles 506A-F are configured to hold a respective ring scanner device, such as ring scanner devices 504A-C. Each respective ring scanner device 504A-C is situated on a corresponding charging cradle 506A-F. Each charging cradle 506A-F has a set of magnets positioned to couple with a ring scanner device 504A-C and position the ring scanner device 504A-C for electrical and/or communicative connection. In one example, the electrical and/or communicative connection may be a USB connection. In another example, the electrical connection may be a wireless charging terminal, such as a Qi charging terminal.

Figure 6:
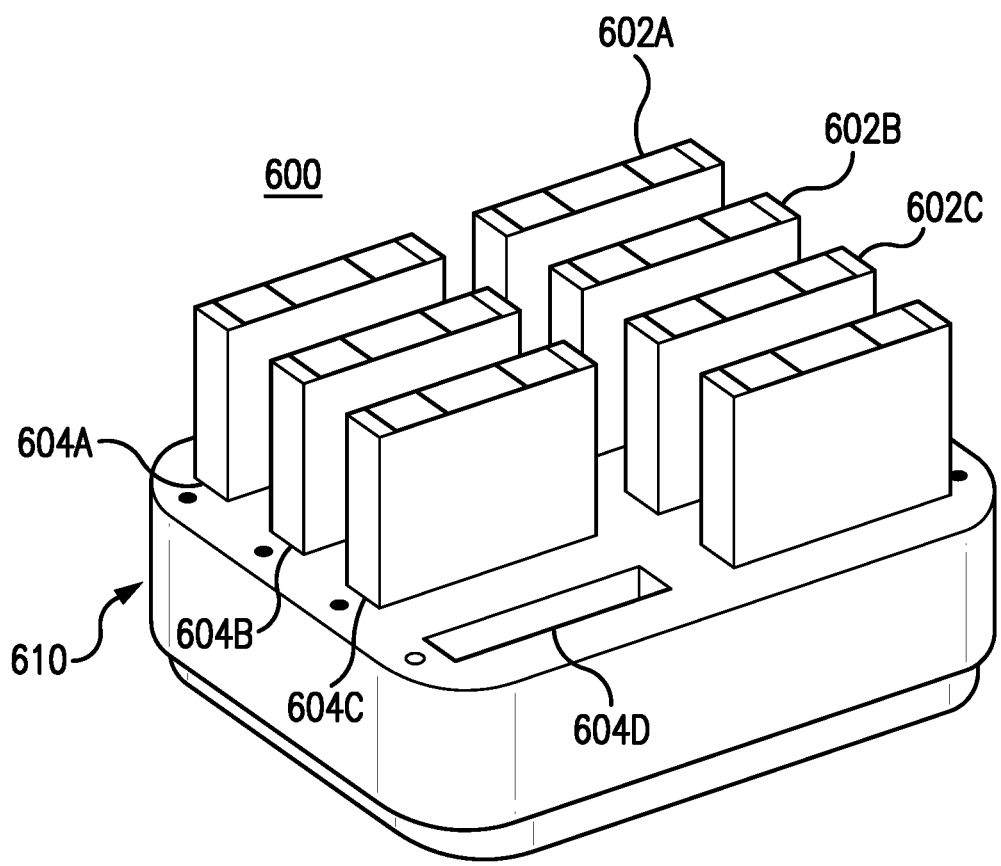

FIG. 6 is a diagram 600 illustrating a charging cradle apparatus 610 for a ring scanner device, according to an embodiment. As mentioned above, each ring scanner device has a removable battery that allows the battery to be swapped out, allowing the scanner device to continue to be used without loss of productivity. Charging cradle apparatus 610 is adapted to charge the removable batteries.

Charging cradle apparatus 610 includes a plurality of slots, such as slots 604A-D. Each slot is configured to accept a rechargeable battery, such as batteries 602A-C. When a battery is inserted into a slot, charging cradle apparatus 610 charges the battery.

FIG. 7 is an architecture diagram 700 illustrating hardware components of the ring scanner, according to an embodiment. As discussed with respect to previous figures, diagram 700 includes display 708, optical scanner 710, plurality of buttons 220, battery 306, and speaker 352. In addition to those components, diagram 700 includes a processor 702, memory 704, light sensor 708, wired terminal 716, vibrator 722, Bluetooth interface 726 and Wi-Fi interface 724. Each of these components may be enclosed within housing 408 shown in FIG. 4.

Bus 728 is a communication system that transfers data between the hardware components of a ring scanner. In addition to transferring data, bus 728 may also transfer electrical power, such as from battery 306 to other components. In this way, bus 728 communicatively and electrically couples the various components together.

It may be appreciated for those skilled in the art that a plurality of signal lines or buses 728 may exist, thus different components may be linked by different signal lines or buses 728, and that a signal line or buses 728 depicted in the schematic diagram may represent a plurality of such.

Memory 704 may include random access memory (RAM) and may also include nonvolatile memory, such as read only memory (ROM) and/or flash memory. Memory 704 may be embodied as an independent memory component, and may also be embedded in another component, such as processor 702, or may be embodied as a combination of independent as well as embedded, and/or a plurality of memory components is present, the invention is not so limited. Memory 704 is adapted to include software modules (a module is a set of instructions), such as those described below for FIG. 9.

Processor 702 is adapted to run instructions stored in memory 704. Processor 702 may be a micro-controller unit (MCU), a digital signal processor (DSP) and/or an Image/Video Processing unit or the like components that run instructions. An example of an MCU is MSP432P401x, available from Texas Instruments Inc. of Dallas, Texas. An example of a DSP is C5000, available from Texas Instruments Inc. of Dallas, Texas. An example of an image/video processor is OMAP3525, available from Texas Instruments Inc. of Dallas, Texas One or more processors 702 may be present. Processor 702 may be an independent component, it may also be embedded in another component, such as in image sensor 702, or any combination thereof.

Wired terminal 716 is adapted to attach to a wired network, including, but not limited to, Ethernet, USB or thunderbolt.

Diagram 700 includes two wireless interfaces, Wi-Fi interface 724 and Bluetooth interface 726. Wi-Fi interface 724 may provide a network interface accessible by applications running on processor 702. Bluetooth interface 726 may be adapted to enable the ring scanner device to interact with peripheral devices, such as headsets (not shown).

Light sensor 708 is a photodetector. It is a sensor of light. A photo detector has a p-n junction that converts light photons into current. The absorbed photons make electron-hole pairs in the depletion region. Photodiodes and photo transistors are a few examples of photo detectors. In a different example, light sensor 708 may be a photoemission or photoelectric effect photodetector, thermal photodetectors, polarization photodetectors, or photochemical photodetectors.

In an example operation, light sensor 708 may signal to processor 702 when light is detected. Processor 702, in turn, may adjust the brightness of display 708. Automatically adjusting brightness in this way may have the effect of conserving power in battery 306.

Vibrator 722 is a device that causes vibration when receiving a specified signal from processor 702. Vibrator 722 is a mechanical device to generate vibrations. To generate the vibrations, vibrator 722 may include an electric motor with an unbalanced mass on its driveshaft. Vibrator 722 may be a vibrating structure gyroscope implemented as a microelectromechanical system (MEMS).

Speaker 352 is coupled to processor 702 and is configured to cause the ring scanner device to emit sound as specified by commands from processor 702. In this way, speaker 352 may provide audio to a user of the ring scanner device as specified by an application running on processor 702.

Plurality of buttons 222 may send commands to processor 702, or other components such as optical scanner 210. When a user presses one of the plurality of buttons 222, a signal may be sent to processor 702. That signal may cause an interrupt command in the software application running in processor 702, causing processor 702 to run specific commands that an application specifies to correspond to that button input. In this way, using plurality of buttons 222, a user can trigger actions as specified by the application running on processor 702.

In response to inputs it receives from plurality of buttons 222, processor 702 can output information to display 208 as specified by a software application running on processor 702. In addition, as mentioned above, display 208 can be a touchscreen display. In this way, interactive applications can be implemented within a ring scanner device.

In addition, not shown, other input devices may be included, such as a radiofrequency identification (RFID) reader and a near field communication (NFC) reader. RFID uses electromagnetic fields to automatically identify and track tags attached to objects. An RFID system consists of a tiny radio transponder, a radio receiver and transmitter. When triggered by an electromagnetic interrogation pulse from RFID reader 116, an RFID tag transmits digital data back to the reader. A NFC reader may allow for collection of payment data from an EMV chip or from a user's mobile device (not shown).

In examples, these NFC and RFID readers may be used for login purposes. An operator can swipe her badge in vicinity of a ring scanner having these features and the ring scanner can log her in using the information received from the NFC chip or the badge. Then, when the operator is using the ring scanner device, any scanned items are tracked with an identification of the operator who logged into the scanner.

Figure 8:
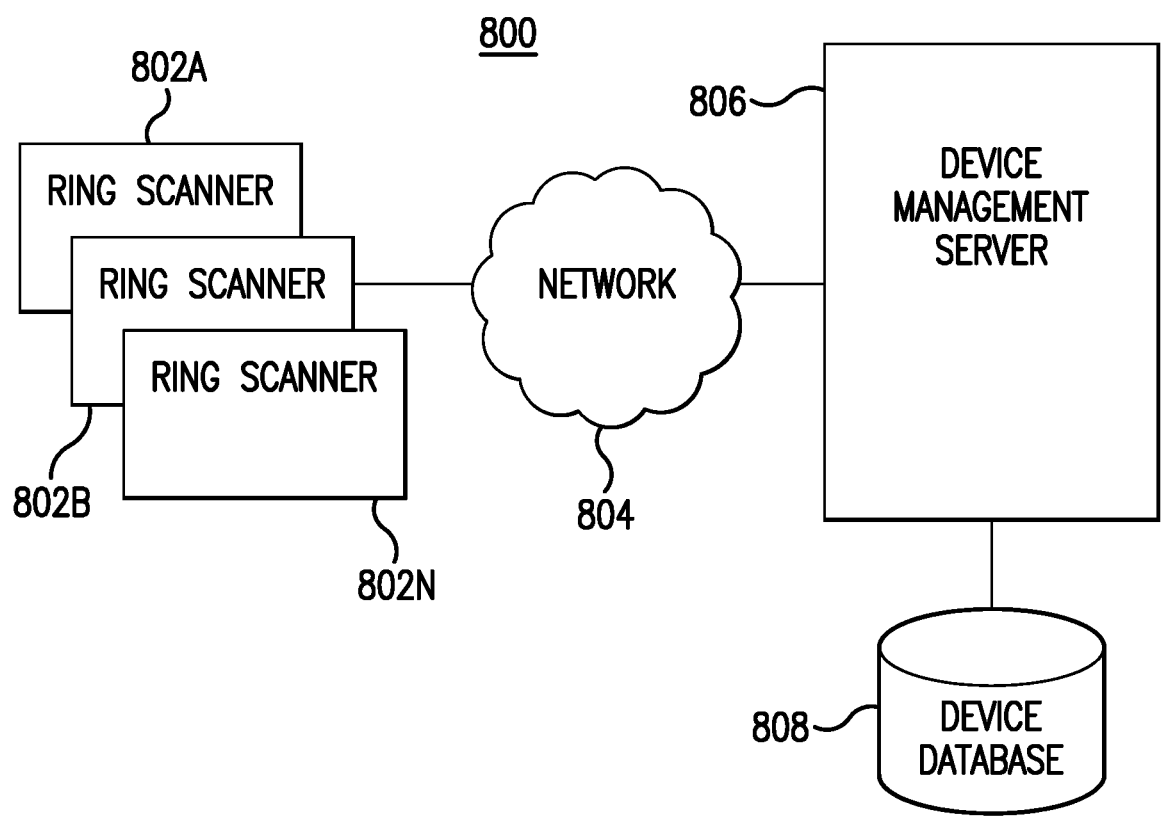
FIG. 8 is a diagram illustrating network of ring scanners, according to an embodiment.

FIG. 8 illustrates a system 800 illustrating a network of ring scanners, according to an embodiment. System 800 includes a plurality of ring scanner devices 802A-N coupled to a device management server 806 via network 804.

Network 804 enables communication between the various ring scanner devices 802A-N and device management server 806. Network 804 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Device management server 806 enables administration of ring scanner devices 802A-N. Device management server 806 allows for remote administration of ring scanner devices 802A-N in a consistent and scalable way. Device management server 806 is coupled to a device database 808.

Once a device 802A-N has enrolled and registered in device database 808, it becomes a device managed by device management server 806. The various services provided by device management server 806 may include: (i) ensuring that ring scanner devices 802A-N are configured to a consistent standard and supported set of applications, functions, or corporate policies, (ii) updating applications, functions, or policies installed on ring scanner devices 802A-N, (iii) ensuring that users use ring scanner devices 802A-N in a consistent and supportable manner, (iv) ensuring that ring scanner devices 802A-N operate correctly (diagnosing and troubleshooting device 802A-N), and (v) monitoring and tracking ring scanner devices 802A-N (e.g. location, status, ownership, activity).

Device management server 806 may provide the management services to the ring scanner devices 802A-N via a push message over network 804. Device management server 806 may send the push message to ring scanner devices 802A-N, without ring scanner devices 802A-N first requesting that message. The ring scanner devices 802A-N may execute a device manager 904 daemon (discussed further below with respect to FIG. 9) that listens for the push message to update any changes to the management services. Additionally or alternatively, ring scanner devices 802A-N may periodically or intermittently poll device management server 806 for any changes to the services.

Device management server 806 may be implemented on any computing device, including processor and memory. It may also include a plurality of computing devices, such as a server farm.

In various examples, communication between device management server 806 and ring scanner devices 802A-N may be based on extensible web service capabilities using standard and open protocols, such as XML (Extensible Markup Language), HTTPS (Hypertext Transfer Protocol Secure) to support transactions over the secure network connections.

Once a device has enrolled in an enterprise service (i.e. has become a managed device), according to one embodiment, management services may be delivered to the managed device from a management server of the enterprise service securely via a mechanism leveraging a push network coupling the management server and the mobile device. The push network may enable the management server to push a notification to wake up the mobile device (or a device manager waiting in the mobile device) for receiving management services. In turn, after verifying a trust of the notification pushed, the mobile device may poll the management server via separate secure network connections to retrieve commands for the management services via the secure network connections. The management server may be based on extensible web service capabilities using standard and open protocols, such as XML (Extensible Markup Language), HTTPS (Hypertext Transfer Protocol Secure) to support transactions over the secure network connections.

Figure 9:
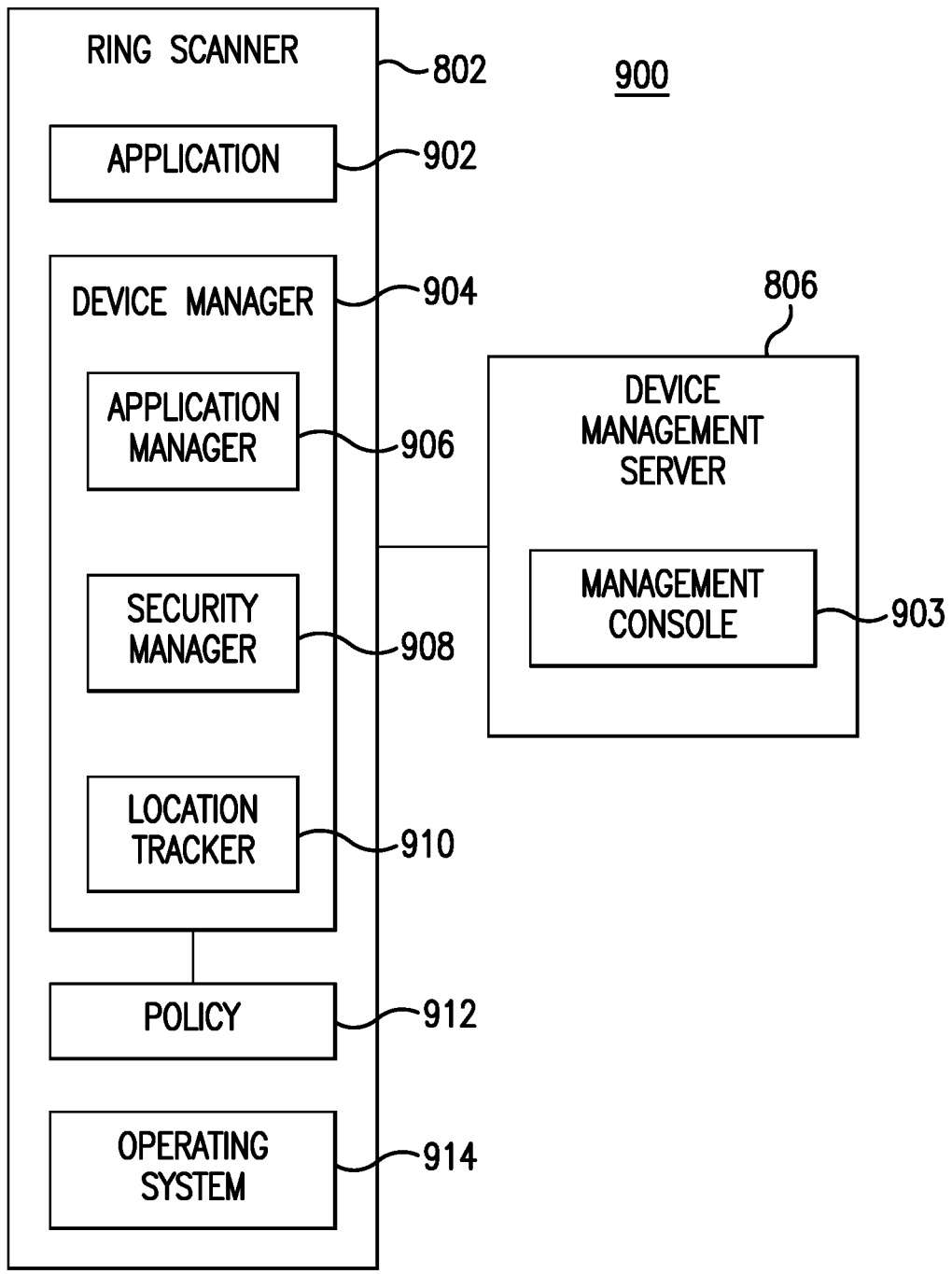
FIG. 9 is a diagram illustrating functional modules of a ring scanner, according to an embodiment.

FIG. 9 is a diagram illustrating functional modules of a ring scanner device 802 and device management server 806, according to an embodiment. These various functional modules are preferably implemented as software modules, but can be implemented in whole or in part in hardware, firmware, software, or any combination thereof.

As illustrated in FIG. 9, ring scanner device 802 includes an application 902, device manager 904, which is coupled to a policy 912, and an operating system 914.

Application 902 is software to carry out a specific task other than one relating to the operation of the computing device itself, typically to be used by end-users. Application 902 may specify operations not performed by system software, relating to the operation of the computer, and utility software (both of which may be provided by operating system 914). In an embodiment, application 902 specifies how a ring scanner's processor is to update the ring scanner's display responsive to the data input from input device.

In one example operation, application 902 may cross-reference the code decoded from an optical scanner with a list, for example, a list of known packages that are to be intercepted. When the code is on the list, it may notify an operator of the ring scanner device. For example, it may notify the operator by displaying a message on its screen, playing an audible sound, and/or activating a vibration.

Device manager 904 is a process to implement device management services on ring scanner device 802. To implement device management services, device manager 904 may include one or more daemons that listen for instructions from device management server 806 and implement the received instructions. Device manager 904 may also report to device management server 806 any requested device configuration information, diagnostic information, or tracking information.

In one embodiment, device manager 904 may be a daemon process which sleeps while waiting for a notification pushed from management server 806. A processing unit may suspend a process or thread in a sleep state and execute other processes or threads. The processing unit may continue to execute the suspended process or thread when they wake up from the sleep state.

Device manager 904 may wake up in response to the notification received. For example, device manager 904 may initiate secure network connections via network 804 with management server 904 to perform management operations. Device manager 904 may go back to sleep, e.g. when instructed by the device management server 806 or when deferring performing certain management operations. In some embodiments, device manager 904 may disconnect the secure network connection prior to going back to sleep.

Device manager 904 includes an application manager 906, security manager 908, and location tracker 910.

Application manager 906 is configured to receive, via the network interface and from device management server 806, any new or updated application. Application manager 906 can also install the new or updated application to update the operations of the ring scanner device. This install may, for example, involve requiring a restart of ring scanner device 802.

Security manager 908 receives from device management server 806 any updates to policy 912 and enforces the policy 912. In examples, policy 912 may specify security rules restricting user access to ring scanner device 802 in a manner that promotes security. Such security rules may include device lock and passcode/password rules and renewals, user roles, and access to application 902.

In addition, security manager 908 may support other security commands from device management server 806. For example, security manager 908 may execute a command from device management server 806 to erase ring scanner device 802 (e.g. to completely reconfigure a mobile device two factory defaults). Security manager 908 may service queries of device information (e.g. device capacity, serial number etc.), and network information (e.g. phone number, subscriber identity module numbers, media access control addresses), policy 912 and installed applications.

Security manager 908 may include an identity certificate as a certificate payload for ring scanner device 802 to authenticate itself to management server 806 over SSL network connection via network 804. Once a management profile is removed (or uninstalled) from device database 808, a corresponding ring scanner may no longer be managed by device management server 806.

Location tracker 910 enables device management server 806 to query ring scanner device 802 for location information. Location information may include network information (such as a Wi-Fi SSID). In an alternative embodiment, ring scanner device 802 may have a GPS receiver and the location information may be coordinates from a satellite-based global positioning system. Location tracker 910 may also receive a message from device management server 806 to ping for a lost device. When location tracker 910 receives the ping request, it may play an audible sound to help locate ring scanner device 802.

Operating system 914 is a system software that manages computer hardware, software resources, and provides common services for computer programs. An operating system (OS) is system software that manages computer hardware, software resources, and provides common services for computer programs.

Operating system 914 schedules tasks for efficient use of the system resources (such as processor and memory resources). Operating system 914 acts as an intermediary between programs and for memory allocation and access to input and output components. For example, as application 902 is executed by processor 702, application 902 may make system calls to operating system 914 to access output devices. Or, application 902 may be interrupted by operating system 914 in response to an input device. An example of Operating system 914 is the ANDROID operating system, available from Alphabet, Inc. of Mountain View, CA.

Management console 903 enables an administrator to control device management server 806. For example, in response to user input into management console 903, device management server 806 can update policy 912 or application 902, query the scanner device for location information, and ping the scanner device to emit an audible sound to help locate the ring scanner device.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications, such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. An ergonomic ring scanner device, comprising:
an optical detector positioned on the scanner device to read an optical label and is directed to face opposite from a palmar side of at least one finger of a hand of a user;
a loop configured to enable the user to maintain a grip of the scanner device by enclosing the at least one finger such that the user is able to maintain the grip with only the at least one finger without aid of a palm of the hand;
a body piece comprising an upper body portion affixed to the optical detector and the loop such that, when the at least one finger grips the loop and the hand is in a neutral position wherein the neutral position is a position the user does not pronate the hand, the body piece is positioned to rest on a portion of an index finger of the hand, the portion of the index finger facing a thumb of the hand, wherein the body piece comprises an opening;
a computing device;
a display affixed to the body piece and configured to enable the computing device to display a visual output through the opening,
wherein the display comprises a touchscreen configured to, when selected, input information into the computing device, wherein the display is angled away from the at least one finger to face the user to enable the thumb of the hand to select the touchscreen when the at least one finger grips the loop and when the at least one finger is bent at a proximal interphalangeal joint such that the at least one finger faces the palm; and
a trigger button positioned on the scanner such that, when the at least one finger of the hand is bent at the proximal interphalangeal joint, the trigger button is proximal to the palm relative to the touchscreen and is selectable by the thumb of the hand.

2. The scanner device of claim 1, further comprising:
the trigger button configured to, when selected, activate the optical detector.

3. The scanner device of claim 1, further comprising:
a second button configured to, when selected, input data into an interactive application on the computing device and positioned to be selected by the thumb of the hand when the loop is gripped by the at least one finger.

4. The scanner device of claim 3, wherein the second button is positioned to be selected by the thumb of the hand when the at least one finger grips the loop and is bent at the proximal interphalangeal joint.

5. The scanner device of claim 1, wherein the loop comprises:
an adjustable strap positioned to, in conjunction with the body piece, encircle the at least one finger; and
a semi-rigid portion situated between the adjustable strap and the at least one finger when gripped by the hand.

6. The scanner device of claim 5, wherein the semi-rigid portion is flexible such that, as the adjustable strap is tightened, the tightened strap pulls the semi-rigid portion to tighten on the at least one finger.

7. The scanner device of claim 6, wherein the semi-rigid portion is made of rubber or a rubber-like material.

8. The scanner device of claim 1, wherein the optical detector and the loop are oriented with respect to one another such that, when the optical label is oriented in a first direction and the at least one finger is gripping the loop, the palm of the hand is oriented in a second direction that is orthogonal to the first direction.

9. The scanner device of claim 1, wherein the loop is configured to, in conjunction with the body piece, encircle the at least one finger.

10. The scanner device of claim 1, further comprising:
a charging port configured to electrically couple to a cradle and positioned such that the charging port rests on the cradle when coupled.

11. The scanner device of claim 10, further comprising:
at least one magnet positioned to align the charging port to the cradle to enable electrical coupling.

12. The scanner device of claim 1, further comprising a removable battery configured to power the optical detector.

13. The scanner device of claim 12, wherein the removable battery is configured to be charged by sliding the removable battery into a slot of a charging cradle apparatus.

14. The scanner device of claim 1, wherein the at least one finger consists of a middle finger and the index finger of the hand.

15. The scanner device of claim 1, wherein the optical detector is a one dimensional reader, and wherein the optical detector and the loop are oriented with respect to one another such that, when the optical label is oriented in a direction to be read horizontally and the at least one finger is gripping the loop, the palm of the hand is oriented in a vertical direction.

16. The scanner device of claim 1, further comprising a speaker coupled to the computing device.

17. The scanner device of claim 1, further comprising a vibrator coupled to the computing device.

* * * * *